March 24, 1931.  K. SCHMIEDER  1,797,842
FLEXIBLE CURVE
Filed April 26, 1928
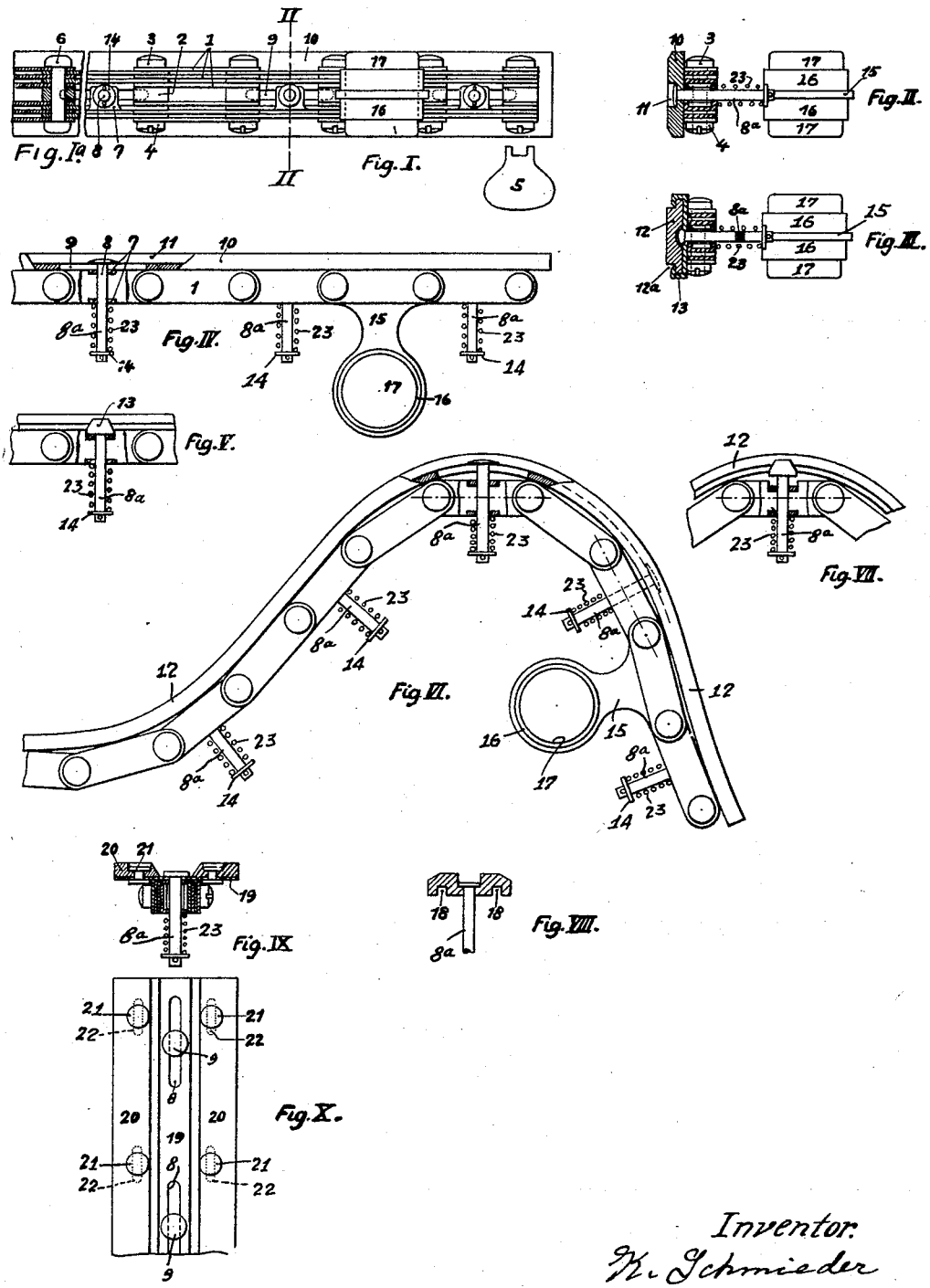
Inventor.
K. Schmieder Patented Mar. 24, 1931

1,797,842

UNITED STATES PATENT OFFICE

KARL SCHMIEDER, OF DRESDEN, GERMANY

FLEXIBLE CURVE

Application filed April 26, 1928, Serial No. 273,097, and in Germany April 30, 1927.

This invention pertains to an adjustable curve-scriber which consists of a flexible ruler secured to a hinged chain.

According to the invention the ruler is fastened to the hinged chain through spring bolts, movable in the cross direction, the heads of which are slidable in a groove of the flexible ruler, and whose springs are supported on shackles of the hinged chain by means of washers. The drawing illustrates an example of its construction, viz.:

Fig. I is the front view of the flexible ruler.

Fig. Ia is a detail.

Fig. II is the sectional view on line II—II of Fig. I.

Fig. III is a similar section showing a modification.

Fig. IV is a plan.

Fig. V is a detail of a modified form.

Fig. VI is the curve-scriber of Figure II adjusted in curvature.

Fig. VII is the curve-scriber of Figure V adjusted in curvature.

Fig. VIII is the sectional view of a ruler formed to increase the flexibility.

Fig. IX is a sectional view showing the ruler in closed condition.

Fig. X is a plan of same.

Each chain link is composed of a number of shackles 1 which with those of the two neighbouring chain links are alternately placed upon each other. Between the innermost shackles are placed small washers 2. The connection of the shackles 1 and the washers 2 is effected by screw bolts 3 whose nuts 4 press the shackles together, thus producing the necessary friction. The frictional forces necessary for rigidity can be regulated through the number of shackles of one link. The nuts 4 which are provided with slots, are tightened with a spanner 5. 6 are rivets. The inner shackles of each second link are provided with apertured projections 7 each of which carries a small bolt 8. The bolts 8 pass through slots 9 of the flexible ruler 10 which is of an elastic material such as rubber; their heads slide in its longitudinal slot 9. Figs. III, V and VII show slight modifications.

In order to fix the flexible ruler more easily on the chain, and with a view to avoiding the weakening of this ruler by the slots 9, I apply a flexible ruler with the cross section 12 (Figure III), and in the edges of said ruler are notched two rabbets 12a. The bolts 8a are provided with claws 13 in the shape of a C. These claws engage the ruler 12 in the rabbets 12a, leaving only the drawing edge projecting. For the sake of preventing the ruler 12 from jamming when sliding in the claws 13 (in consequence of the latter's rotation) the bolts 8a are made non-circular in cross section or in some other way, prevented from turning.

The bolts 8, 8a on the opposite side of the ruler 10, 12 carry small springs 23 which are secured by means of washers 14, whereby it is possible that the flexible ruler 10, 12, when bent in the convex sense, can move away from the hinged chain, while it is otherwise attached to it.

For the convenient securing of the curve-scriber there are joined—at suitable intervals—strengthened link washers 15 with broader punched shackles. In these latter are placed short tube pieces 16 in which rubber pieces 17 of round form are interpolated in order to avoid the sliding on the drawing plane. In order to increase the flexibility of the elastic ruler 10 reduce the material at 18 on the back side of same. The flexible ruler 10 can also be made of a steel blade 19 on which, by means of countersunk bolts 21, are fastened edges 20 of elastic material; the bolts 21 are movable in slots 22 of the steel blade.

The curve-scriber may be rapidly adjusted to draw any desired curvature by simple bending by hand, as far as the tensile strength of the elastic material admits of it. The automatic drag of the links produced through the friction, hold the ruler in any given form. In consequence of the peculiar manner of connection of the flexible ruler with the articulated chain, the ruler is automatically pressed onto this chain. The curve-scriber being of symmetrical construction, it is possible to also draw with it the reflected image of the adjusted curve by turning it by 180° against the drawing plane. In consequence of its automatic dragging it may further be used, through the simple pressing against profiles, for the reproduction of profiles of parts of machinery, architectures, skull forms etc.

I claim:

1. As an improved article of manufacture, a flexible curve-scriber comprising links, means pivotally connecting the links, a flexible ruler member, and springs connecting the said ruler member and some of the links.

2. A structure in accordance with claim 1 in which are employed means cooperable with said links to constitute an automatic drag to hold the curved member at the desired curvature.

KARL SCHMIEDER.